United States Patent [19]

Vaynberg

[11] Patent Number: 5,570,585

[45] Date of Patent: Nov. 5, 1996

[54] UNIVERSAL COOLING SYSTEM AUTOMATICALLY CONFIGURED TO OPERATE IN COMPOUND OR SINGLE COMPRESSOR MODE

[76] Inventor: Mikhail Vaynberg, 411 Hazelwood Dr., San Francisco, Calif. 94127

[21] Appl. No.: 317,001

[22] Filed: Oct. 3, 1994

[51] Int. Cl.$^6$ .................................. F25B 7/00; F25B 1/00
[52] U.S. Cl. ............... 62/175; 62/196.3; 62/228.3
[58] Field of Search .................. 62/175, 510, 228.3, 62/196.3; 236/1 EA

[56] References Cited

U.S. PATENT DOCUMENTS

| | | | |
|---|---|---|---|
| 2,221,688 | 11/1940 | Gibson | 236/1 EA |
| 4,594,858 | 6/1986 | Shaw | 62/175 |
| 4,679,404 | 7/1987 | Alsenz | 62/228.5 |
| 4,735,055 | 4/1988 | Taylor et al. | 62/115 |
| 4,787,211 | 11/1988 | Shaw | 62/117 |
| 4,788,829 | 12/1988 | Takemasa et al. | 62/335 |
| 4,852,362 | 8/1989 | Conry | 62/175 |
| 4,876,859 | 10/1989 | Kitamoto | 62/117 |
| 4,899,554 | 2/1990 | Kato et al. | 62/175 |
| 5,035,119 | 7/1991 | Alsenz | 62/225 |
| 5,050,397 | 9/1991 | Sugiyama et al. | 62/175 |
| 5,095,712 | 3/1992 | Narreau | 62/113 |
| 5,231,846 | 8/1993 | Goshaw et al. | 62/175 |
| 5,265,434 | 11/1993 | Alsenz | 62/117 |
| 5,316,073 | 5/1994 | Klaus et al. | 165/11.1 |

*Primary Examiner*—William E. Wayner
*Attorney, Agent, or Firm*—Townsend and Townsend and Crew LLP

[57] ABSTRACT

A broad range cooling system is provided which can operate to cool and store a product load to a predetermined temperature in the range of −25° F. to +75° F. over an ambient temperature range of −60° F. to 150° F. The system includes two compressor systems which are configurable to operate independently as single stage compressor cooling systems each having a unique cooling range, or together as a single stage compressor system or a compound system, depending upon the desired temperature requirements of the load and the existing ambient. In the event of a failure of one or the other compressor, the system is configured to continue operation with the other compressor as a single stage compressor system until a repair can be affected.

17 Claims, 5 Drawing Sheets

UNIVERSAL COOLING SYSTEM AUTOMATICALLY CONFIGURED TO OPERATE IN COMPOUND OR SINGLE COMPRESSOR MODE

FIELD OF THE INVENTION

This invention relates to the field of cooling systems. More particularly, this invention relates to a compound refrigeration system configured to operate efficiently over a broad range of temperatures at any ambient temperature.

BACKGROUND OF THE INVENTION

Single compressor refrigeration systems are well known for cooling, freezing, storing, and transporting frozen and cooled products such as food, chemicals and other sensitive things like blood, human organs, etc. Generally, single compressor systems are inadequate for cooling a load to about −20° F. (for example ice cream) at a high ambient temperature. Commercially available refrigeration systems having a single compressor or multiple compressors in parallel can cool a load to about 0° F. Unfortunately, purchasers of refrigeration systems desire a system which can maintain a load at very low temperatures (e.g. −20° F. and lower) at high ambient temperatures (e.g. 120° F. and higher).

By way of example, consider a single compressor system for cooling a load to −20° F. in an ambient environment of 120° F. In this case, the necessary evaporator temperature is typically at least 10° F. colder than the load temperature or −30° F. Under these conditions using refrigerant R12, the evaporator pressure is expected to be approximately 12 psia and using R22, the expected pressure is approximately 20 psia. Similarly, the condenser temperature necessary to discharge heat to the ambient is about 10°–40° F. warmer than the ambient under the best case conditions (e.g. 130° F.). Therefore, the pressure in the condenser should be approximately 196 psia for R12 and 312 psia for R22. This dictates a compression ratio of 196/12≈16.5 for R12 and 312/20≈15.6 for R22. Refrigeration compressors, however, are designed and built to operate with a compression ratio no greater than 10 to 15. If the pressure ratio exceeds the manufacturer's design criteria, the compressor will break. Accordingly, neither example above could be achieved with a conventional single compressor system. Indeed, a commercially available compressor can not operate under the above conditions and accordingly, such a system would be prohibitively expensive and inefficient. Thus, commercially available single compressor systems are incapable of operating where the difference between the desired product temperature and the actual ambient temperature is very large.

Compound compressor systems are well known. These systems typically comprise low and high stage compressors coupled together in series so that refrigerant flows through both of these compressors. It is well understood that in compound compressor systems the compression ratio is split between the low and high stage compressors, thereby allowing the system to achieve low evaporator pressure (i.e. low temperature) at high ambient temperatures. The compression ratio for the compound system is the product of the compression ratio for both the low and the high stage compressors. A compound system for the R22 example described above would also have a compression ratio of at least 16 and both the low and high stage compressors would operate at equal pressure ratios, i.e., approximately 4 for each compressor. This compression ratio is well within an acceptable range of the specifications of commercially available compressors and at these conditions the compressor efficiencies are quite high.

Cooling systems also require a minimum compression ratio to operate efficiently. As the difference between the product temperature and the ambient temperature is reduced, the compression ratio for the cooling system is also reduced. If the compression ratio becomes too low, the compressor capacity becomes too large and the compressor will short cycle and eventually break. In addition, the compressors in a compound system run less efficiently than a single stage compressor system when the difference between the load and ambient temperature decreases.

What is needed, therefore, is a system and method for cooling a load of product to a desired temperature which can efficiently operate over a broad range of ambient (−60° F. to +120° F.) and load temperatures (−25° F. to +75° F.).

SUMMARY OF THE INVENTION

The present invention is directed to a universal refrigeration system configured to operate over a broad range of desired load and ambient temperatures. To accomplish this, the system includes first and second compressors, a condenser, an expansion valve and an evaporator coupled together in series. The system further includes a controller with a closing element that is movable between a first position, where refrigerant flows from the first compressor to the second compressor, a second position, where the refrigerant bypasses the second compressor and flows directly to the condenser, a third position, where the refrigerant flows from the evaporator directly to the second compressor and then to the condenser, and a fourth position, where the refrigerant is compressed and discharged by both compressors in parallel into the condenser. With this configuration, the system can be adapted to operate independently as a single stage compressor cooling system with any one or two compressors in parallel, or together in series as a compound system, depending upon the desired temperature requirements of the load and the given ambient.

Preferably, the first and second compressors each have different capacities, allowing a wider flexibility to control the temperature. Considering that compressor capacities can be controlled by changing the speed, such flexibility allows the system to operate efficiently in a wide range of desired load and ambient temperatures. In addition, this flexibility allows the system to use an environmentally friendly refrigerant, such as Freon-22, to achieve low temperatures. In the event of a failure of one or the other compressor, the system is configured to continue operation with the other compressor as a single stage compress or system until a repair can be made.

In a preferred configuration, the controller comprises a microprocessor having a temperature sensor for sensing the room temperature, which is typically the temperature of the compartment housing the product or load. The microprocessor is adapted to determine the ratio between the discharge and suction pressures of both compressors (i.e. compression ratio), which is sensed by pressure transducers. The microprocessor can also determine the ambient temperature and the temperature difference between the room and the desired load temperature input by the user. If the temperature inputted by the user has not been achieved and the compression ratio reaches a predetermined threshold value (preferably about 8 to 10), the microprocessor will move the closing element into the first position so that the system operates in the compound mode. If the temperature reaches the desired temperature before the compression ratio reaches the threshold value, the microprocessor will maintain the closing element in the second position so that the system operates in the single stage mode. Preferably, the compression ratio threshold value is inputted by the user and can be adjusted within the manufacturers, specifications.

In one embodiment, the closing element includes a first solenoid valve positioned between the first compressor outlet (discharge) and the second compressor inlet (suction) and a second solenoid valve positioned between the first compressor discharge and the condenser inlet. When the system commences operation, the microprocessor will start the first compressor, close the first solenoid valve and open the second solenoid valve as long as the compression ratio is less than the threshold value so that the refrigerant is compressed only by the first compressor (single compressor mode). If the first compressor fails, the pressure transducers will register a compression ratio of one and the microprocessor will start the second compressor deenergize first compressor and close both solenoid valves (i.e. the single compressor mode with a different compressor).

The microprocessor is configured to automatically open the first solenoid valve, start the second compressor and close the second solenoid valve when the compression ratio exceeds the threshold value so that the refrigerant is compressed by both compressors in series, i.e. compound mode. In the compound mode, the microprocessor energizes the electronic expansion valve which controls the suction temperature of the second compressor at about 65° F. by injecting liquid refrigerant into the second compressor inlet.

With the above configuration, the universal refrigeration system of the present invention can be operated in at least four different configurations, compound mode, single compressor mode with either compressor (each one having a different capacity) and single compressor mode with the compressors in parallel. This flexibility allows the system to operate over a broad range of desired load temperatures from −25° F. to 75° F. and ambient temperatures of about −60° F. to +120° F.

The above is a brief description of some deficiencies in the prior art and advantages of the present invention. Other features, advantages and embodiments of the invention will be apparent to those skilled in the art from the following description, accompanying drawings and appended claims.

DESCRIPTION OF THE PREFERRED EMBODIMENT

Figure 1:
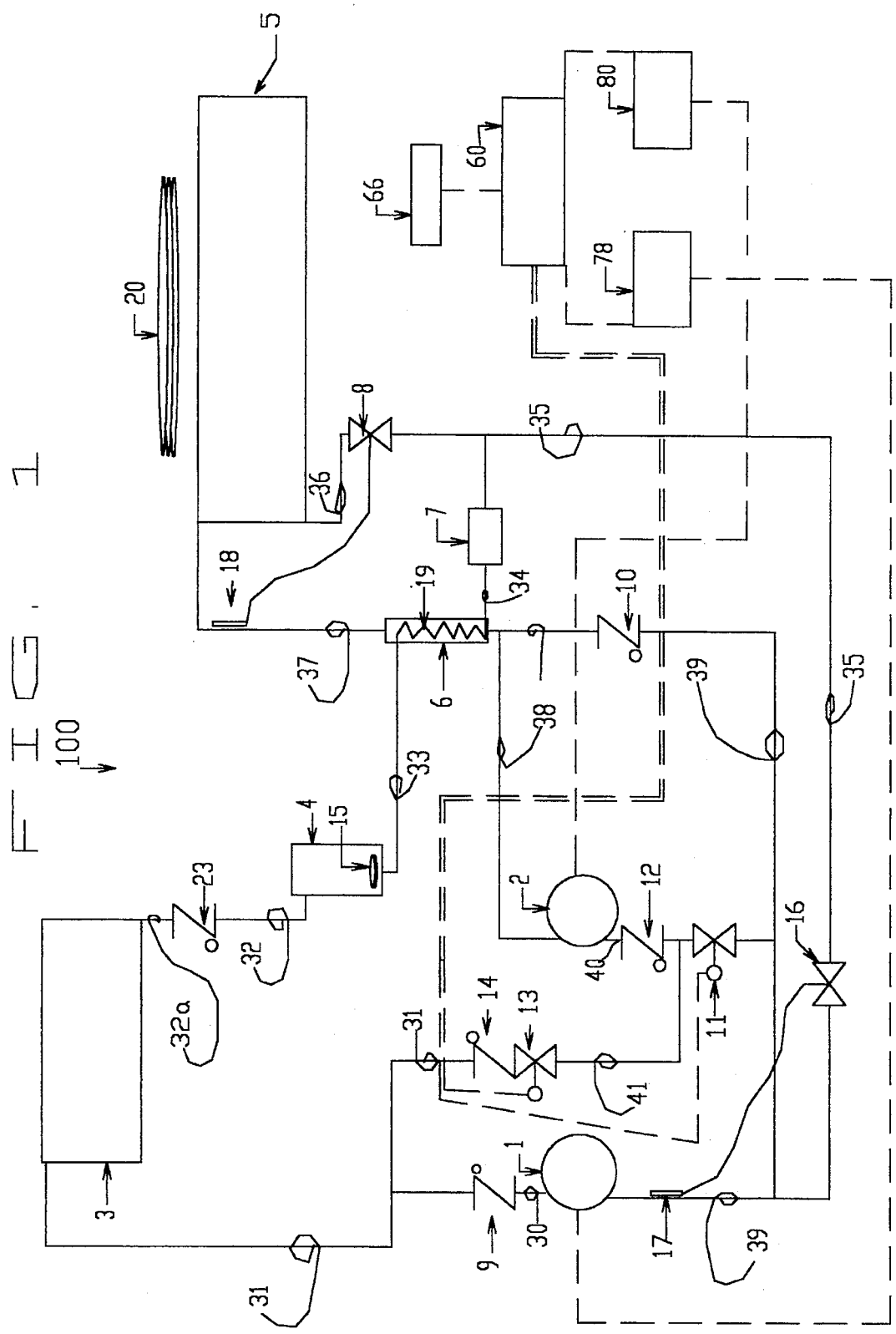
FIG. 1 shows a perspective view of a schematic diagram of the cooling system of the present invention.

The cooling system of the preferred embodiment of the present invention can be adapted to operate in four different configurations. The system can operate as two single stage compressor systems (with either the first or second compressor operating), or both in parallel this provides the opportunity to either cool the product or just maintain the temperature of the pre-cooled product, or two compressors in series as a compound cooling system to achieve low room temperature. If the difference between the desired temperature of the product and the ambient temperature is sufficiently small, the apparatus according to the present invention can automatically configure the system to operate in the single stage mode with either one of the two compressors. The temperature difference is deemed sufficiently small if the compression ratio would be too small to operate efficiently if the system were configured in the compound mode. The compressors preferably have different capacities to provide an even broader range of cooling capability. If the difference between the set temperature of the product and the ambient temperature is sufficiently large, the apparatus can automatically configure the system to operate in the compound mode after the temperature of the load is pulled down by the single compressor until the compression ratio reaches the threshold value. The difference is deemed large if the compression ratio would exceed the acceptable specifications when operating in single compressor mode.

Referring to the drawings in detail, wherein like elements are indicated by like numerals, a closed loop refrigeration system 100 is illustrated according to the principles of the present invention. Refrigeration system 100 generally includes first and second compressors 1, 2, a condenser 3, an expansion valve 8 and an evaporator 5 coupled together in series.

Referring to FIG. 1, the operation of refrigeration system 100 in any of the above modes will be described. The hot refrigerant gas discharged by either first or second compressors 1, 2 gives up heat to the air or water in condenser 3 and condenses to a liquid. The output of condenser 3 is coupled to a check valve 23 and a receiver 4 via liquid pipes 32a and 32. The liquid passes through a liquid pipe 33 into a heat exchanger coil 19 of a suction accumulator 6. The output of heat exchanger coil 19 is coupled with a filter\dryer 7 via a liquid pipe 34. The output of filter\dryer 7 is coupled with a thermostatic expansion valve 8 and electronic expansion valve 16 via a "Y" pipe 35. For the purposes of this specification, a "Y" pipe is defined as a pipe that is plumbed to more than two elements on the cooling circuit to one another. A thermostatic bulb 18 of thermal expansion valve 8 is mounted on a cold gas pipe 37. A thermostatic bulb 17 of electronic expansion valve 16 is mounted on a cold gas pipe 39.

Expansion valve 8 is closed and the liquid refrigerant flowing through thermostatic expansion valve 8 enters an evaporator(s) 5 via a liquid pipe 36. One evaporator coil 5 is utilized in the preferred embodiment. It will be apparent to one of ordinary skill in the art, however, that first and second compressors 1, 2 can be replaced with a plurality of compressors and evaporator coil 5 can be replaced with a plurality of evaporators as is typical in conventional refrigeration systems. In addition, the invention is not limited to a thermostatic expansion valve 8 and this valve can comprise a variety of conventional valves such as an electronic expansion valve.

Expansion valve 8 throttles the liquid refrigerant, thereby lowering the pressure and temperature of the liquid refrigerant. The cold liquid refrigerant boils in evaporators 5 absorbing the heat of a room where the load is stored and evaporating into a cold gas. Additional heater(s) 20 are provided to assist in defrosting of the evaporator(s) 5. Under certain cold ambient temperatures, heater 20 can be used to maintain the product temperature higher than the ambient. The cold gas returns via a cold gas pipe 37 which is coupled to the shell of suction accumulator 6. The cold vapor in the shell of suction accumulator 6 removes some heat from the liquid refrigerant in heat exchanger coil 19 and exits suction accumulator 6. The output of suction accumulator 6 is coupled to a cold gas "Y" pipe 38 which, in turn, is coupled to first compressor 1 and to a check valve 10. The output of check valve 10 is coupled to a cold gas "Y" pipe 39 which is coupled to a first solenoid valve 11 and second compressor 2.

In the event that the system is operating in a single stage compressor mode using only second compressor 2, the cold gas from suction accumulator 6 via pipe 39 enters second compressor 2 which compresses the gas into a hot gas line 30 which is coupled to a check valve 9. Check valve 9 is coupled to a check valve 14 and to condenser 3 via hot gas "Y" pipe 31.

In the event that the system is operating in a single stage compressor mode using only first compressor 1, the cold gas from suction accumulator 6 enters first compressor 1 via pipe 38. First compressor 1 compresses the gas into hot gas line 40 which is coupled to check valve 12. which, in turn, is coupled to solenoid valve 11 (which is closed) and solenoid valve 13 (which is open). The output of solenoid valve 13 is coupled to the input of check valve 14 via hot gas pipe 41. The output of check valve 14 is coupled to the output of check valve 9 and input of condenser 3 via hot gas "Y" pipe 31.

In the event that the system is operating in a single stage compressor mode using both compressors 1, 2 in parallel, solenoid valve 13 is open and solenoid valve 11 is closed. The refrigerant will then flow along cold gas pipes 38 and 39 into compressors 1, 2 as described above.

In order to perform the compound cooling operation, two compressors are provided. The discharge of first compressor 1 is coupled to hot gas line 40, which is coupled to check valve 12. In this case, solenoid valve 13 is closed and solenoid valve 11 is open. Thus, the refrigerant flows through check valve 11 via "Y" pipe 39 into the input of second compressor 1. The hot gas discharged by first compressor 1 is cooled with liquid refrigerant injected by electronic expansion valve 16 which senses the temperature of the gas with a thermostatic bulb or temperature sensor 17 and keeps it at about 65 degrees before it enters the suction of second compressor 2. Note that the desired suction temperature of second compressor 2 can be inputted by the user.

Operating in the compound mode, refrigeration system 100 is capable of producing temperatures as cold as $-25°$ F. even when the ambient temperature is as high as $150°$ F. In the compound mode, neither compressor need operate at pressure ratios in excess of the manufacturer's specification in order to achieve the necessary cooling. Compressor 1 can also cool additional rooms with products which require higher desired load temperatures then additional expansion valves and evaporators in these rooms will be installed and the suction pipe will have solenoid valves and will be connected to suction pipe 39.

In certain cold climate conditions, the ambient temperature surrounding the refrigeration system can be low enough that an insufficient pressure differential exists for thermal expansion valve 8 to open and feed the liquid refrigerant into evaporators 5 so that the cooling system will not operate. For such conditions of operation, a heater 15 is provided in the base of receiver 4. Heater 15 heats the liquid, which boils, thereby increasing the pressure in receiver 4 to a level providing sufficient pressure differential to allow the system to start normally. The increased pressure will close check valve 23 so that the pressure in condenser 3 does not change. After the system has commenced operation, heater 15 is automatically turned off. With this configuration, refrigeration system 100 can be used from the hottest to the coldest climates.

Figure 2:
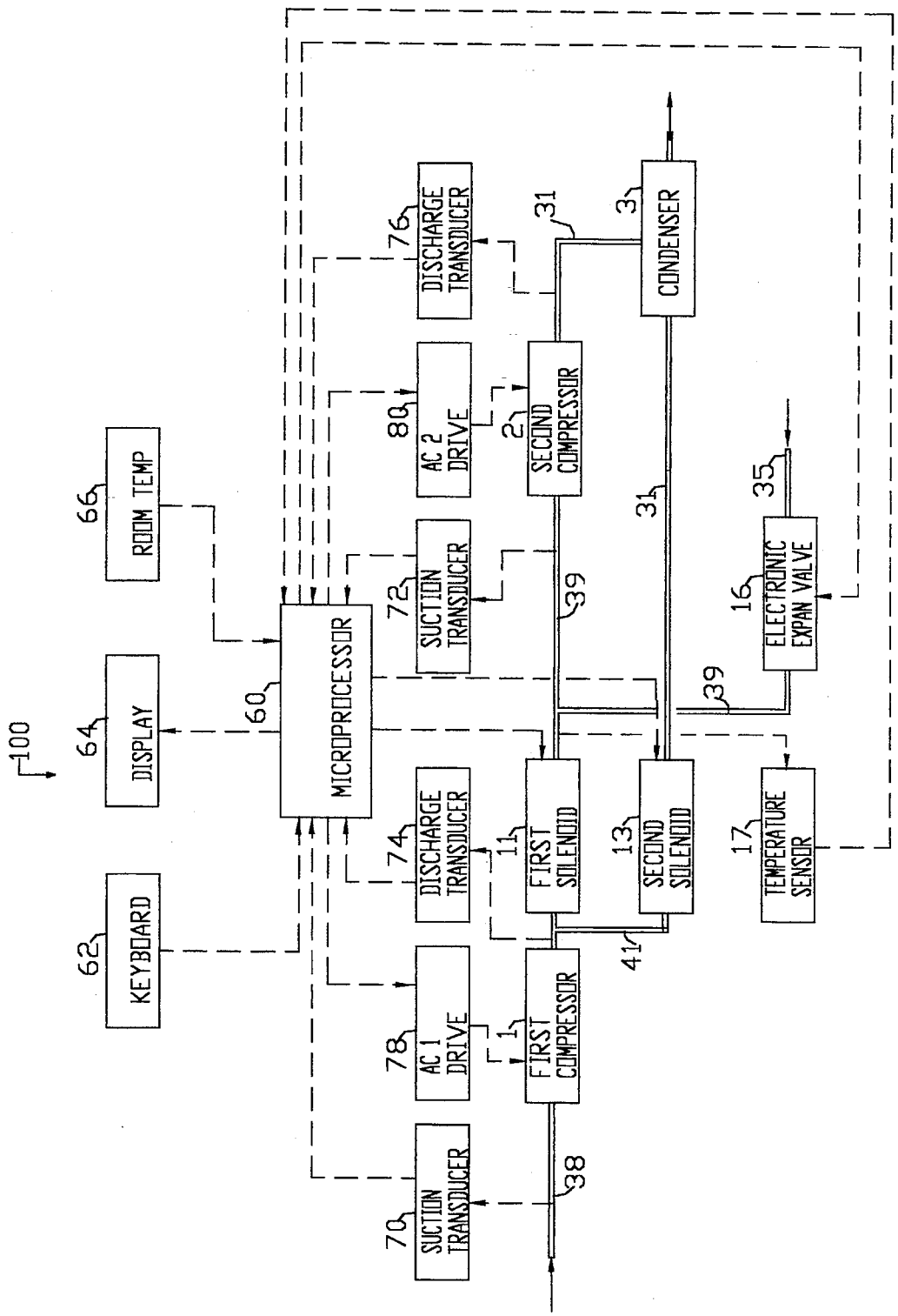
FIG. 2 is a block diagram of a microprocessor based refrigeration control system.

FIG. 2 illustrates a microprocessor-based control system for controlling refrigeration system 100. However, it should be understood that an analog or digital control system may achieve similar results. The control system of FIG. 2 includes a microprocessor 60, a keyboard 62 for inputting system parameters such as the desired load temperature or the compression ratio, and a display 64 for displaying the data received from microprocessor 60. A load temperature sensor 66 (or a plurality of sensors) is connected to microprocessor 60 for determining the temperature of the load to be cooled by refrigeration system 100. Solenoid valves 11, 13 are connected to microprocessor 60 in a conventional manner. Microprocessor 60 will open and close solenoid valves 11, 13 depending on whether refrigeration system 100 should be in the compound or single compressor mode, as discussed below.

First and second compressors 1, 2, each have suction transducers 70, 72, located on the inlet or suction sides of the compressors and discharge transducers 74, 76 located on the outlet or discharge side of the compressors The transducers generate an electric signal representative of the measured pressures at the inlet and outlet ports of compressors 1, 2 so that microprocessor 60 can compute the compression ratio for each compressor 1, 2. The desired compression ratio for each compressor may be input via keyboard 62. Refrigeration system 100 further includes (or may not) AC drives 78, 80 for driving compressors 1, 2, respectively. Drives 78, 80 are connected to microprocessor 60, which is adapted to vary the frequency of each drive 78, 80 thereby varying the speed of each compressor 1, 2.

When the system is operating in the compound mode, the hot compressed refrigerant exiting first compressor 1 is too hot for the inlet or suction side of second compressor 2. To decrease the temperature of the refrigerant entering second compressor 2, temperature sensor 17 is positioned at the second compressor inlet and coupled to microprocessor 60 via a signal line. When the temperature is above a predetermined level (preferably 65° F.), electronic expansion valve 16 opens so that a portion of the cool liquid refrigerant exiting heat exchanger 19 is bled through pipe 35 into the inlet of second compressor 2. The refrigerant flow rate along pipe 35 can be varied to maintain the suction temperature within a suitable range, preferably about 55°–75°.

Temperature sensors 17 and 66 and pressure transducers 70, 72, 74 and 76 control whether one or the other compressor operates, or both compressors 1, 2 operate as a single stage compressor system or compound system depending upon the desired temperature of the load in relation to the ambient temperature. In operation, the user enters the desired temperature into controller 60 via a keyboard 66. Controller 60 then calculates the compression ratio at each compressor 1, 2 with the transducers and checks the temperature difference between the desired load and room temperatures. When the compression ratio reaches the preset threshold value (preferably about 8–10) and the desired temperature is not yet achieved, controller 60 automatically configures the system to operate in compound mode. Otherwise, it configures the system to operate in single stage compressor mode using either the first or second compressor 1 or 2. If the system determines that one of the compressors is non-functional, it can automatically switch to operation as a single stage compressor system using the other compressor.

Figure 3:
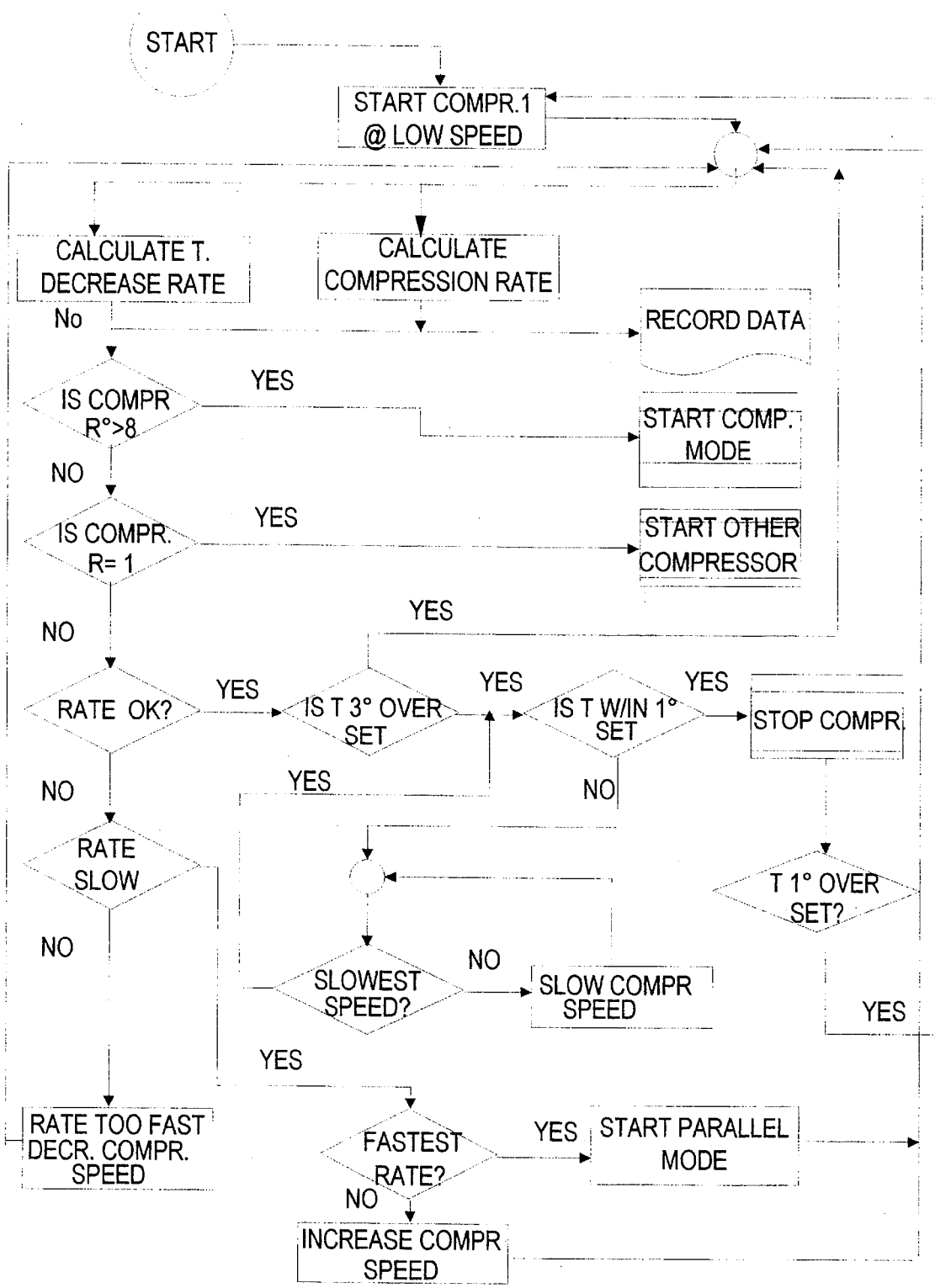
FIG. 3 is a flow chart illustrating the operation of the microprocessor based control system of FIG. 2 for a second compressor in a single compressor mode.
Figure 4:
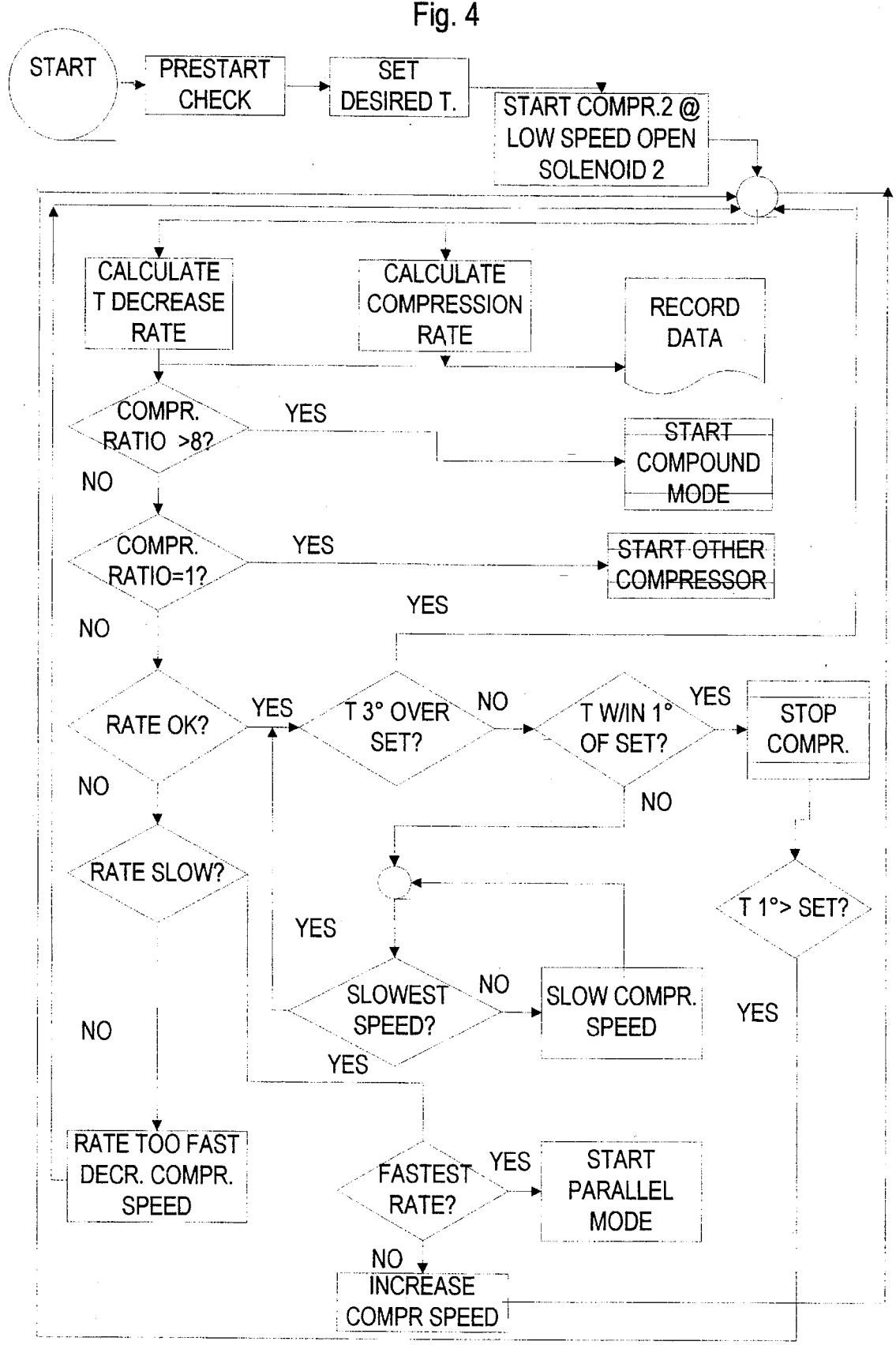
FIG. 4 is a flow chart illustrating the operation of the microprocessor based control system of FIG. 2 for a first compressor in the single compressor mode.
Figure 5:
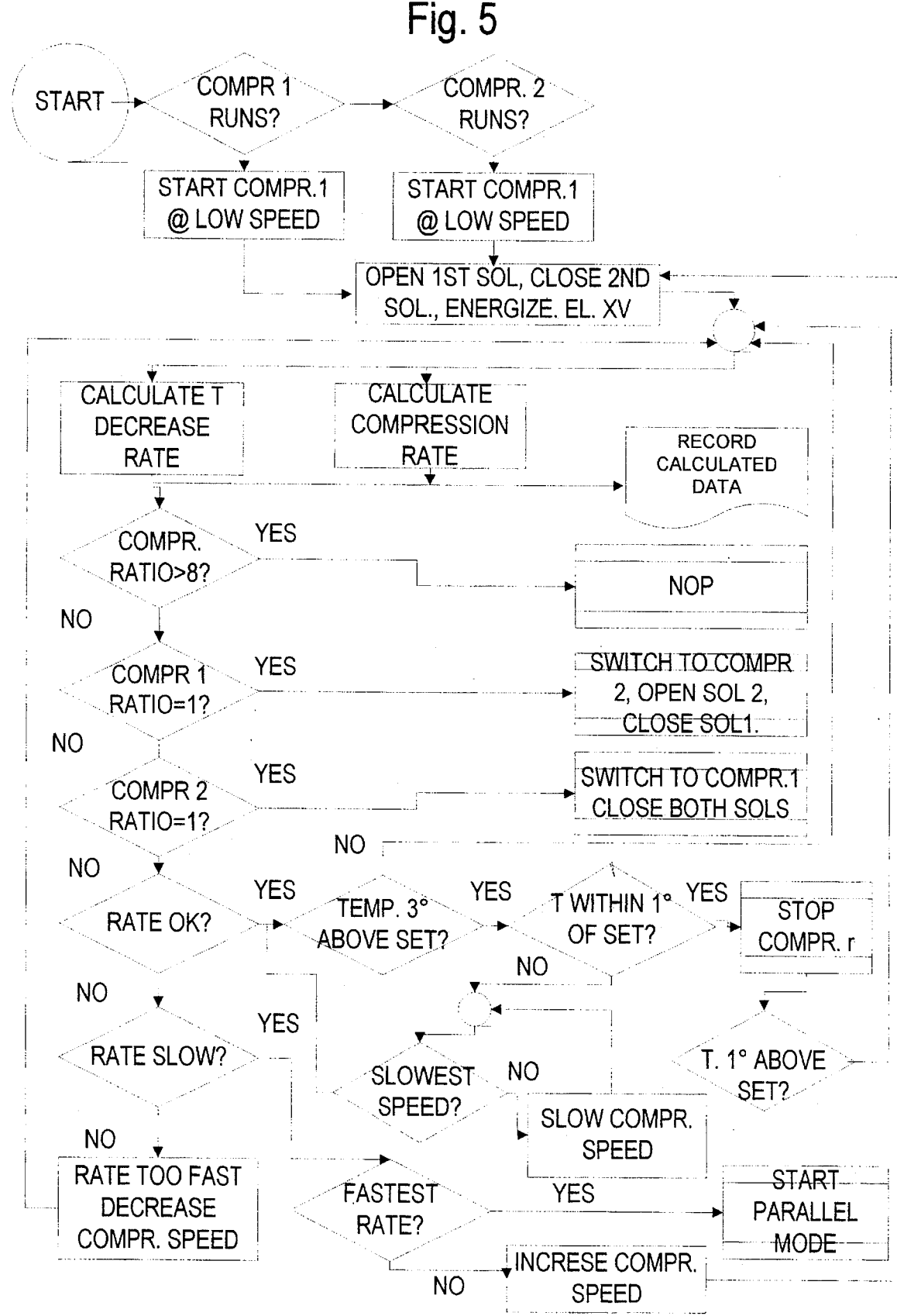
FIG. 5 is a flow chart illustrating the operation of the microprocessor based control system of FIG. 2 for both the first and second compressors in the compound mode.

FIGS. 3-5 illustrate flow diagrams for the control system shown in FIG. 2 when refrigeration system 100 is operating in the compound and single compressor modes. FIG. 3 illustrates the standard operating cycle flowchart for first compressor 1 (note that operation of second compressor 2 is similar to that of first compressor 1 so only FIG. 3 will be described in detail). As discussed above, the user first inputs a desired temperature through keyboard 62. First compressor 1 is then started at a low speed and solenoid valve 13 is opened. Microprocessor 60 calculates the temperature decrease rate and the compression ratio across first compressor 1 with the sensors and transducers. If the temperature inputted by the user has not been achieved and the compression ratio reaches a predetermined threshold value (preferably about 8 to 10), the microprocessor will close solenoid valve 13 and open solenoid valve 11 so that the system operates in the compound mode. If the compression ratio ever drops as low as 1, first compressor 1 has suffered a breakdown and second compressor 2 will be started.

If the temperature reaches the desired temperature before the compression ratio reaches the threshold value, the microprocessor will preferably slow down first compressor 1 in increments to about 66% of the speed starting about 3° F. above the desired temperature. If at the slowest compressor speed the temperature reaches the desired room temperature, the microprocessor will stop the compressor at the set point temperature. When the room temperature goes up one degree above the set point, the compressor would come on maintaining the room temperature within 1° F. of the user inputted temperature.

FIG. 5 illustrates operation of refrigeration system 100 in the compound mode. First, microprocessor 60 determines if both compressors 1, 2 are working, then starts them at a low speed. Solenoid valve 13 is closed and solenoid valve 11 is opened so that refrigerant flows from the discharge of first compressor 1 to the inlet of second compressor 2. Electronic expansion valve 16 is actuated to control the temperature at the inlet of second compressor 2. As long as the compression ratio from condenser 2 to evaporator 5 remains above 8, refrigeration system will remain in the compound mode. When the compression ratio drops below 8, microprocessor 60 will configure the solenoids and stop one of the compressors so that the refrigerant only flows through one compressor. If the compressions ratio across either compressor 1, 2 drops to 1, that compressor will be deenergized, the other compressor will be started and the solenoids configured so that refrigerant only flows through the working compressor.

The above is a detailed description of a particular embodiment of the invention. It is recognized that departures from the disclosed embodiment may be made within the scope of the invention and that obvious modifications will occur to a person skilled in the art. The full scope of the invention is set out in the claims that follow and their equivalents. Accordingly, the claims and specification should not be construed to unduly narrow the full scope of protection to which the invention is entitled.

What is claimed is:

1. A cooling system comprising:

first and second compressors each having an inlet and an outlet, the outlet of the first compressor being coupled to the inlet of the second compressor;

a condenser coupled to the compressor outlets;

an expansion valve coupled to the condenser;

an evaporator coupled to the expansion valve and the compressor inlets;

a controller for selectively controlling fluid flow through the system, the controller having a closing element movable between a first position, where the fluid flows from the first compressor outlet to the second compressor inlet, and a second position, where the fluid flows from the first compressor outlet directly to the condenser; and one or more sensors coupled to the closing element for sensing a compression ratio across the first and second compressors.

2. The system of claim 1 further comprising a second closing element movable between a first position, where the fluid flows from the evaporator to the second compressor inlet to bypass the first compressor, and a second position, where the refrigerant flows from the evaporator through both the first and second compressors in parallel.

3. The system of claim 1 wherein the controller includes a temperature sensor for sensing an ambient temperature, the controller being adapted to determine a difference between the ambient temperature and a preset desired temperature.

4. The system of claim 1 wherein the controller is adapted to move the closing element into the first position when the compression ratio is above a threshold value and to move the closing element into the second position when the compression ratio is equal to or below the threshold value.

5. The system of claim 1 further including a temperature sensor, positioned at the second compressor inlet, for sensing the temperature of fluid entering the second compressor.

6. The system of claim 5 further including an electronic expansion valve fluidly coupled to the expansion valve and electrically coupled to the temperature sensor, the electronic expansion valve being adapted to control fluid flow such that the temperature at the second compressor inlet is maintained within a predetermined range.

7. The system of claim 1 further including a valve positioned downstream of the evaporator, the valve being adapted to direct the fluid from the evaporator to the first compressor inlet.

8. The system of claim 7 further including means for controlling the valve so to redirect the fluid from the evaporator directly to the second compressor inlet thereby bypassing the first compressor.

9. A cooling system comprising:

first and second compressors each having an inlet and an outlet, the outlet of the first compressor being coupled to the inlet of the second compressor;

a condenser coupled to the compressor outlets;

an expansion valve coupled to the condenser;

an evaporator coupled to the expansion valve and the compressor inlets; and a controller for selectively controlling fluid flow through the system, the controller having a closing element movable between a first position, where the fluid flows from the first compressor outlet to the second compressor inlet, and a second position, where the fluid flows from the first compressor outlet directly to the condenser the closing element including a valve positioned between the first compressor outlet and the second compressor inlet.

10. The system of claim 9 wherein the valve includes first and second solenoid valves, the first solenoid valve being positioned along a first line coupling the first compressor outlet to the second compressor inlet and the second solenoid valve being positioned along a second line coupling the first compressor outlet to the condenser.

11. A cooling system comprising:

first and second compressors each having an inlet and an outlet;

a fluid conduit having a primary line coupling the first compressor outlet to the second compressor inlet and a bypass line;

a condenser coupled to the second compressor outlet by the primary line and to the first compressor outlet by the bypass line;

an expansion valve coupled to the condenser;

an evaporator coupled to the expansion valve and coupled to the compressor inlets; and a controller electrically coupled to a first valve on the primary line and a second valve on the bypass line for selectively controlling fluid flow from the first compressor outlet such that the fluid either flows along the primary line to the second compressor inlet or along the bypass line directly to the condenser.

12. System of claim 11 wherein the controller is a microprocessor.

13. The system of claim 12 wherein the microprocessor comprises a sensor adapted to sense a compression ratio across the first and second compressors, the microprocessor being adapted to open the first valve and close the second valve when the compression ratio is above a threshold value and to close the first valve and open the second valve when the compression ratio is equal to or below the threshold value.

14. The system of claim 13 wherein the system will operate in a compound system mode when the fluid flows along the primary line and in a single system mode when the fluid flows along the bypass line.

15. A method for cooling a container comprising the steps of:

providing a refrigeration circuit comprising first and second compressors, a condenser, an expansion valve and an evaporator coupled together in series;

directing fluid through the first compressor;

computing a compression ratio for the refrigeration circuit;

directing the fluid along a primary line from the first compressor to the second compressor when the compression ratio exceeds a threshold value;

directing the fluid along a bypass line from the first compressor directly to the condenser when the compression ratio is equal to or below the threshold value; and pumping the fluid through the expansion valve and the evaporator to cool the compartment.

16. The method of claim 15 wherein the computing step includes inputting a desired temperature into a microprocessor and detecting an actual compartment temperature with a temperature sensor.

17. The method of claim 15 further including the step of bleeding a portion of the fluid being directed into the expansion valve into the second compressor to decrease the temperature of the fluid flowing along the primary line into the second compressor.

* * * * *